United States Patent
Chan et al.

(10) Patent No.: US 6,513,043 B1
(45) Date of Patent: Jan. 28, 2003

(54) SYSTEM AND METHOD FOR STORING, RETRIEVING, AND ANALYZING CHARACTERIZATION DATA

(75) Inventors: Mark Che-hung Chan, San Diego, CA (US); Steven William Griffith, San Diego, CA (US); Alan Ward Jelden, Vista, CA (US)

(73) Assignee: Syntricity, Inc., San Diego, CA (US)

(*) Notice: Subject to any disclaimer, the term of this patent is extended or adjusted under 35 U.S.C. 154(b) by 262 days.

(21) Appl. No.: 09/653,932

(22) Filed: Sep. 1, 2000

(51) Int. Cl.⁷ .............................................. G06F 17/30
(52) U.S. Cl. ...................................................... 707/102
(58) Field of Search ............................... 707/4, 7, 102, 707/206; 482/8; 702/130, 183; 600/300

(56) References Cited

U.S. PATENT DOCUMENTS

| | | | |
|---|---|---|---|
| 5,455,945 A | 10/1995 | VanderDrift | 707/2 |
| 5,604,900 A | 2/1997 | Iwamoto et al. | 707/205 |
| 5,649,190 A | 7/1997 | Sharif-Askary et al. | 707/101 |
| 5,687,361 A | 11/1997 | Sarkar | 707/1 |
| 5,745,755 A | 4/1998 | Covey | 707/203 |
| 5,794,246 A | 8/1998 | Sankaran et al. | 707/101 |
| 5,884,311 A | 3/1999 | Blattmann-Bleile et al. | 707/10 |
| 5,940,832 A | 8/1999 | Hamada et al. | 707/100 |
| 5,976,083 A * | 11/1999 | Richardson et al. | 482/8 |
| 6,014,657 A | 1/2000 | Weida et al. | 707/2 |
| 6,047,291 A | 4/2000 | Anderson et al. | 707/103 |
| 6,135,951 A * | 10/2000 | Richardson et al. | 482/8 |
| 6,260,004 B1 * | 7/2001 | Hays et al. | 702/130 |

* cited by examiner

Primary Examiner—Diane D. Mizrahi
Assistant Examiner—Apu M Mofiz
(74) Attorney, Agent, or Firm—Gray Cary Ware & Freidenrich; Terrance A. Meador (57) ABSTRACT

A technique for efficiently structuring a database takes advantage of redundancy in data point conditions to reduce the time associated with the insertion of data points into a database and to reduce the amount of required storage space. The technique is particularly suited for semiconductor characterization data having a large number of test data points collected under repeated test conditions. The data point conditions are analyzed to inventory the different unique conditions associated with the given set of data points. Each unique combination of conditions is assigned a variable array, and each variable array element identifies a specific condition. The data point values are linked to variable set handles that represent the different variable arrays. In this manner, the data points can be inserted into the database without having to store each data point value with all of the corresponding conditions. Rather, the data point values are stored along with their respective variable set handles. The present invention also provides techniques for data extraction, management, and analysis, along with a database management system configured to carry out the various techniques.

31 Claims, 8 Drawing Sheets

|  | MEASURED DATA | SUPPLY VOLTAGE | TEMP. | CURRENT | FREQ. | ... |
|---|---|---|---|---|---|---|
| 402 | 5 ns | 5V | 25° C | 1mA | — | ... |
| 404 | 10 ns | 5V | 25° C | 1mA | — | ... |
| 406 | 20 ns | 6V | 50° C | 2mA | — | ... |
| 408 | 21 ns | 6V | 75° C | 3mA | — | ... |
| 410 | 10 ns | 5V | 25° C | — | 1 MHz | ... |
| 412 | 15 ns | 7V | 50° C | 2mA | 2 MHz | ... |
|  | ⋮ | ⋮ | ⋮ | ⋮ | ⋮ |  |

| | VAR INFO | | | |
|---|---|---|---|---|
|  | VAR NAME | VAR VALUE | VAR ARRAY INDEX | VAR VALUE INDEX |
| 502 | SUPPLY | 5V | 1 | 1 |
| 504 | TEMP. | 25° C | 2 | 1 |
| 506 | CURRENT | 1mA | 3 | 1 |
| 508 | SUPPLY | 6V | 1 | 2 |
| 510 | TEMP. | 50° C | 2 | 2 |
| 512 | CURRENT | 2mA | 3 | 2 |
| 514 | TEMP. | 75° C | 2 | 3 |
| 516 | CURRENT | 3mA | 3 | 3 |
| 518 | FREQ. | 1 MHz | 4 | 1 |
|  | SUPPLY | 7V | 1 | 3 |
|  | FREQ. | 2 MHz | 4 | 2 |
|  | ⋮ | ⋮ | ⋮ | ⋮ |

FIG. 5

| VAR SET INFO ||
| VAR SET HANDLE | VARIABLE ARRAY |||
|---|---|---|---|
| 1 | 1 | 1 | 1 |
| 2 | 2 | 2 | 2 |
| 3 | 2 | 3 | 3 |

600 ←
602 — (row 1)
604 — (row 2)
606 — (row 3)

FIG. 6

| MEASURED DATA | VAR SET HANDLE |
|---|---|
| 5 ns | 1 |
| 10 ns | 1 |
| 20 ns | 2 |
| 21 ns | 3 |
| 10 ns | 4 |
| 15 ns | 5 |

| VAR SET INFO ||
| VAR SET HANDLE | VARIABLE ARRAY ||||
|---|---|---|---|---|
| 1 | 1 | 1 | 1 | -1 |
| 2 | 2 | 2 | 2 | -1 |
| 3 | 2 | 3 | 3 | -1 |

| VAR SET INFO |||||
|---|---|---|---|---|
| VAR SET HANDLE | VARIABLE ARRAY ||||
| 1 | 1 | 1 | 1 | -1 |
| 2 | 2 | 2 | 2 | -1 |
| 3 | 2 | 3 | 3 | -1 |
| 4 | 1 | 1 | -1 | 1 |
| 5 | 3 | 2 | 2 | 2 |
| ⋮ | ⋮ | ⋮ | ⋮ | ⋮ |

608 points to row 3

SYSTEM AND METHOD FOR STORING, RETRIEVING, AND ANALYZING CHARACTERIZATION DATA

FIELD OF THE INVENTION

The present invention relates generally to database management systems. More particularly, the present invention relates to the creation and manipulation of an efficient database structure suitable for use with characterization data having a plurality of variable test conditions.

BACKGROUND OF THE INVENTION

The prior art is replete with database management systems (DBMSs) that control the structuring, writing, organization, and reading of data stored in a database. The prior art also contains a number of techniques for processing and formatting data for insertion into a database. However, many prior art techniques may not be suitable for applications having large amounts of data, complex data, or undefined data parameters. For example, semiconductor wafer manufacturers often have the need to process, format, and review characterization data associated with the individual semiconductor devices. Such characterization data may include electronic test results obtained under a large number of varying test conditions. For example, test data points may be obtained from a single semiconductor device by varying any combination of one or more of the following conditions: supply voltage, supply current, temperature, input frequency, and other test parameters. In addition, a single semiconductor device may be subjected to a plurality of different tests, e.g., RF S-Parameter tests, output frequency tests, and output power tests.

The number of tests, the number of devices tested, and the number of different test conditions will dictate the size of the characterization data file associated with a given lot of semiconductor wafers. In practice, such test data may be associated with thousands (or millions) of individual data points. Furthermore, each individual data point may be associated with any number of varying test conditions, thus requiring a significant amount of data processing and storage capability.

The transfer or downloading of raw data into prior art data analysis systems may be inconveniently time consuming and, therefore, costly. In addition, large amounts of data related to repeated test conditions may require an unnecessarily large amount of storage space to accommodate multiple entries associated with different test points. The resultant database may contain duplicate data entries that are inefficiently structured. In addition, the resultant database may be difficult to manipulate and traverse during data analysis.

Many prior art DBMSs are configured to accommodate a finite number of known data fields. For example, a system used to collect and process semiconductor characterization data may be limited to common data fields associated with typical testing procedures utilized in the semiconductor industry. These systems are not capable of handling additional data fields or test conditions without modification. Accordingly, the inflexible nature of such prior art DBMSs may be impractical for some applications.

BRIEF SUMMARY OF THE INVENTION

A preferred embodiment of the present invention provides a DBMS that is capable of structuring a large amount of data points having a number of associated conditions or attributes. A practical embodiment is utilized for the collection and analysis of semiconductor characterization data. A DBMS according to the present invention processes the incoming data in a manner that takes advantage of repeated conditions. Such efficient handling and processing allows the data to be quickly collected in comparison to prior art techniques. In addition, the resultant database structure requires less storage space and the data stored therein can be efficiently accessed and extracted. Furthermore, a DBMS according to the present invention can automatically and dynamically react to the given size of the data file and to the particular conditions and attributes associated with the individual data points.

The above and other aspects of the present invention may be carried out in one form by a method for structuring a set of data points. The method involves obtaining a plurality of data points, each having a data value and zero or more conditions associated therewith, assigning a variable identifier to each unique condition associated with the data points, designating a variable set handle for each unique combination of variable identifiers, and relating individual data values to one of the variable set handles.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

DETAILED DESCRIPTION OF A PREFERRED EMBODIMENT

The present invention may be described herein in terms of functional block components and various processing steps. It should be appreciated that such functional blocks may be realized by any number of hardware components configured to perform the specified functions. For example, the present invention may employ various memory elements, logic elements, look-up tables, and the like, which may carry out a variety of functions under the control of one or more microprocessors or other control devices. In addition, those skilled in the art will appreciate that the present invention may be practiced in conjunction with the collection, processing, and/or analysis of any type of data and that the semiconductor data analysis system described herein is merely one exemplary application for the invention.

It should be appreciated that the particular implementations shown and described herein are illustrative of the invention and its best mode and are not intended to otherwise limit the scope of the invention in any way. Indeed, for the sake of brevity, conventional techniques for data processing, data transmission, data formatting, data management, data reporting, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical embodiment.

Figure 1:
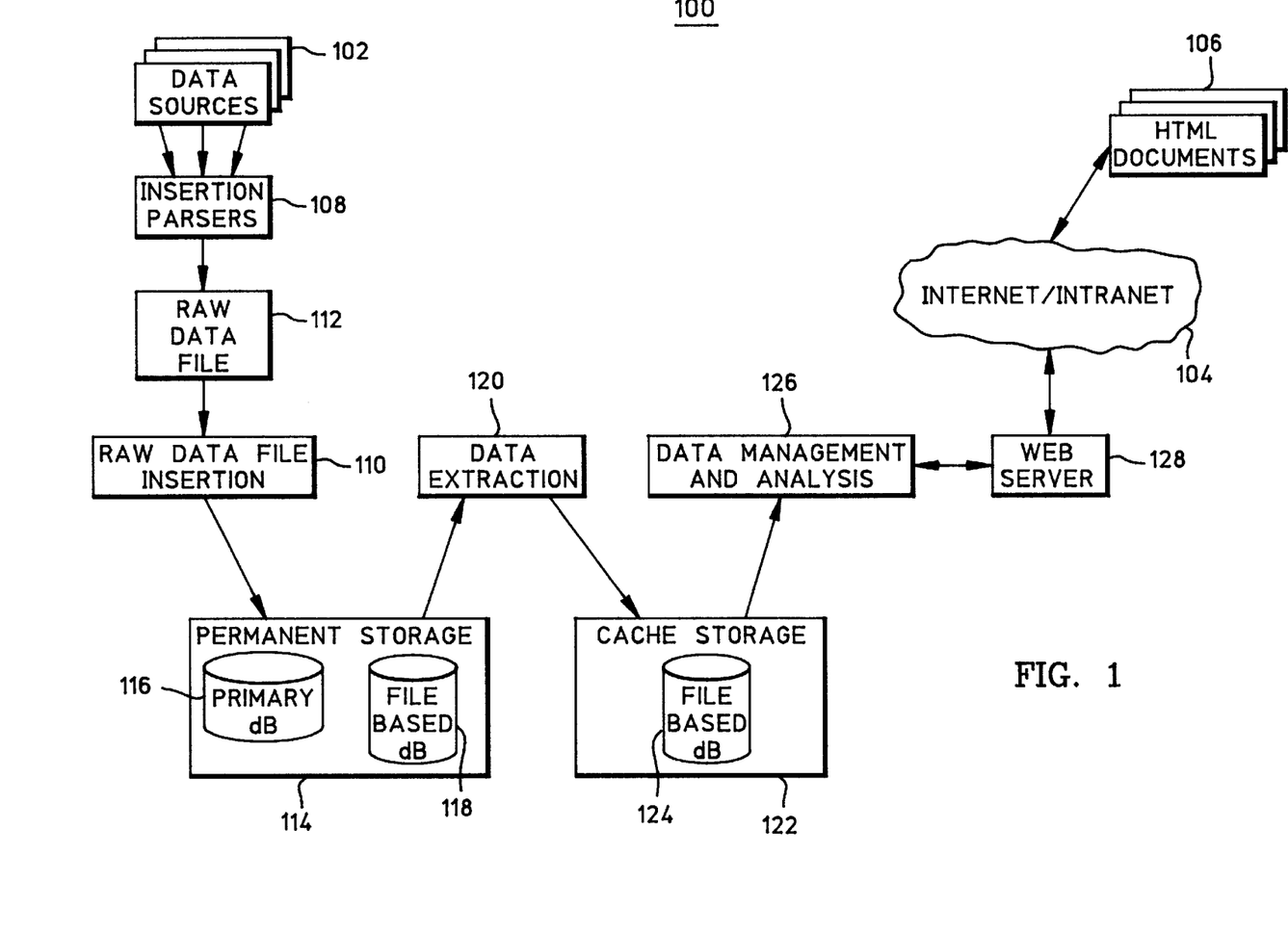
FIG. 1 is a schematic representation of a data storage and retrieval environment.

Referring to FIG. 1, the preferred embodiment of the present invention can be implemented in the context of a data storage and retrieval environment 100. Briefly, data points (along with any respective conditions) generated by one or more data sources 102 are received and processed by a data insertion module, which structures the data points and conditions for storage in a suitable database. The stored data can be retrieved, managed, analyzed, and/or formatted in accordance with various applications. In the preferred embodiment, the data is accessible via a communication network 104 such as the Internet or an intranet. For example, a remote user may access HTML documents 106, e.g., reports, tables, or charts, that represent the collected data. Of course, the data can be alternately presented in any suitable format, and HTML documents 106 are merely utilized herein as one example document format.

More specifically, semiconductor-related data is generated by any number of data sources 102, e.g., automatic test equipment (ATE), bench testing equipment, wafer fabrication equipment, or the like. In a practical implementation, such data may be associated with functional test results of individual dies, wafer-scale manufacturing data, inventory information, or lot control information. In addition, a given data point may have any number of related attributes, variables, or conditions. For example, at the die or serial level, a measured output voltage may be produced by an electronic device after the following test conditions have been set: supply voltage, operating temperature, and input signal frequency. Bin summary data may be classified at the wafer level, and data classified at the lot level may be related to the wafer manufacturing date, the wafer manufacturing equipment, or the location of the fabrication facility. These examples are merely illustrative of a practical application and are not intended to limit the scope or applicability of the present invention in any way.

In a typical application related to semiconductor characterization data, thousands of data points (each having zero or any number of associated conditions) may be generated for a single die or device. In addition, each die is typically subjected to a number of different functional tests such as output frequency measurements, output power, temperature stability, and the like. Furthermore, a single lot may include a large number of dies. Consequently, the collection of one set of characterization data may require the management of millions of individual data fields. Although the example data set described herein relates to characterization data associated with the hierarchical die level, the concepts of the present invention can be extended to accommodate data associated with any hierarchical level.

The raw data produced by data sources 102 may be generated in accordance with a known or predetermined format, e.g., a standardized format, a format utilized by the particular test equipment manufacturer, a format recognized by the data insertion module, a custom format designated by the user of the system, an ASCII format, or the like. The use of a known format enables the system to effectively and efficiently structure the data for insertion into the database. Alternatively, the data insertion module may be suitably configured to "reverse engineer" the incoming raw data in a manner that derives the format.

In the preferred embodiment, the data insertion module includes at least an insertion parsers element 108 and a raw data file insertion element 110. These elements, and various other functional elements described herein, can be realized as any number of software program components. Accordingly, although not shown in FIG. 1, the present invention may be implemented in conjunction with a suitable computing architecture having one or more microprocessors, an appropriate amount of memory, and other features found in conventional computer systems. For example, the various software program elements may reside in a personal computer, in a server node, or in a cluster of computers associated with a computer network.

Insertion parsers element 108 is configured to convert the incoming data into a common format. In accordance with one practical embodiment, insertion parsers element 108 extracts data and metadata from files specific to the individual data sources 102 and converts the information into a raw data file 112. In this manner, the system can accommodate data from a plurality of data sources 102 without regard to the specific formats utilized by the individual sources. Insertion parsers element 108 operates in accordance with conventional data parsing techniques; such techniques are known to those skilled in the art and, therefore, will not be described herein. Insertion parsers element 108 generates a raw data file 112 that contains the commonly-formatted information received from data sources 102. In a practical embodiment, raw data file 112 is an internal file that is not accessible by the user of the system.

Raw data file insertion element 110 is preferably configured to receive raw data file 112 and to normalize, format, and/or structure the raw data in accordance with the techniques described herein. In this manner, raw data file insertion element 110 facilitates the efficient configuring and storage of the data points. Raw data insertion element 110 may be suitably configured to function in an object-oriented database context or in a relational database context. Thus, the present invention may be utilized with different practical applications and the various functional elements described herein may utilize structured query language (SQL) or any suitable database management language.

In a preferred practical embodiment, raw data file insertion element 110 inserts the formatted and normalized data into a "permanent" storage element 114. Insertion element 110 is capable of merging data from different lots or sets to facilitate efficient database storage as a single lot. For example, if data from a first lot is obtained on one day, data from a second lot is obtained on a second day, and both sets of data have the same respective conditions, then insertion element 110 can be instructed to suitably merge the data together.

Storage element 114 may be realized by one or more physical devices capable of storing digital data under the control of the database management techniques described herein. As described in more detail below, storage element 114 may include a primary database component 116 and a file-based database component 118. As used herein, a "file-based" database can be a database that stores and organizes data with files, directories, and an appropriate indexing system. In contrast, primary database component 116 may be a relational database management system (RDBMS) that supports structured query language (SQL) or any suitable database management language. In an exemplary application, primary database 116 is realized as an ORACLE database. As described below, the system allocates different portions of the database structure to primary database component 116 and file-based database component 118 to enable efficient extraction of the data stored therein.

Alternate configurations of storage element 114 may exclusively utilize file-based database components or exclusively utilize RDBMS techniques. For example, database element 116 may also be configured as a file-based database element. The present invention need not be restricted to any particular database configuration, database language, or database structure for purposes of storage element 114.

A data extraction element 120 functions to retrieve a subset of the data stored at permanent storage element 114 for transfer to a cache storage element 122. In a practical embodiment, extraction element 120 is implemented in software. Extraction element 120 may be responsive to a user request to retrieve data for purposes of analysis. The transfer of data to cache storage element 122 facilitates faster access and processing of the cached data. As described above in connection with insertion element 110, extraction element 120 may be configured to perform data merging functions to combine data associated with different lots. In addition, extraction element 120 may be suitably configured to search for and retrieve data points having one or more common conditions or attributes for purposes of analysis. For example, if requested by the user of the system, extraction element 120 can retrieve or group together data points for devices tested at 38° C.

As depicted in FIG. 1, cache storage element 122 preferably includes a file-based database component 124. In a practical implementation, file-based database component 124 may be desirable to reduce database traffic associated with a primary database component, e.g., primary database component 116. As described above in connection with storage element 114, alternate embodiments of cache storage element 122 may utilize any number of relational database elements, any number of file-based database elements, or any suitable combination of such elements. A particular configuration may be selected according to any number of cost metrics, e.g., data storage space limitations, data insertion and extraction efficiency, or the like.

Cache storage element 122 may communicate with a data management and analysis element 126, which is preferably implemented as a software application. Analysis element 126 may include any number of data processing, formatting, and display features that enable the user of the system to view the requested data in an appropriate context. For example, analysis element 126 may be configured to provide semiconductor characterization data, yield monitoring and improvement data, reliability analyses, and quality control results. Analysis element 126 can present the data as a spreadsheet, a table, a graphical plot, a wafer map, a Smith chart, a frequency response chart, a number of reports, or the like. The specific functionality of analysis element 126 and the manner in which the data is manipulated may vary from application to application, and the above examples are not intended to limit the scope of the invention.

The preferred embodiment of the present invention is deployed as a web-based application. Accordingly, data storage and retrieval environment 100 may include a suitable web server 128 that communicates with network 104. Web server 128 is configured in accordance with conventional technologies such that management and analysis element 126 can provide network access to the formatted data. For example, a user can view a summary of test data as an HTML document 106 via the Internet or via a suitable intranet. For purposes of this description, HTML document 106 may be accessed by or downloaded to a web browser application resident in a personal computer, a personal digital assistant, an Internet compatible wireless telephone, or any device capable of supporting HTML.

As mentioned briefly above, insertion parsers element 108, raw data file insertion element 110, data extraction element 120, and data management and analysis element 126 are realized as software program components. In a practical embodiment, all of these software components can reside in a single processing machine (such as a personal computer) or in a cluster of computers associated with a network. In an alternate embodiment, one or more of the software components can be hosted by a third party that provides access to the applications via the Internet. Thus, a semiconductor manufacturer or designer can upload the files from a data source 102 via the Internet (or via an intranet) and therefore control the analysis, management, and reporting of the formatted data in an online fashion.

Figure 2:
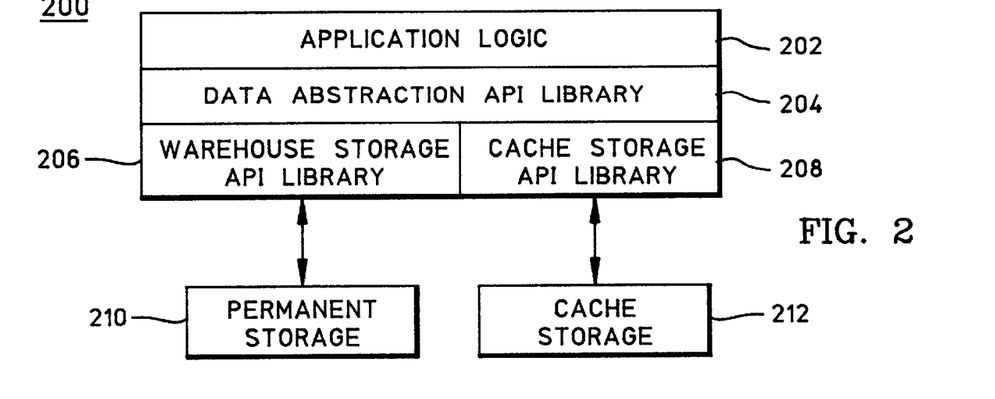
FIG. 2 is a schematic representation of a general program structure that may be employed by various operating components of the system shown in FIG. 1.

In a practical embodiment, raw data file insertion element 110, data extraction element 120, and data management and analysis element 126 are each configured in accordance with the general program structure 200 schematically represented in FIG. 2. Program structure 200 includes an application logic layer 202 respectively associated with the particular functionality of the various elements, i.e., the insertion, extraction, or management/analysis application. A data abstraction application program interface (API) library 204 enables application logic layer 202 to read and write data to one or more data storage elements. Data abstraction API library 204 may include any number of suitably designed software routines.

In the preferred embodiment, data abstraction API library 204 communicates with a warehouse storage API library 206 and with a cache storage API library 208. Warehouse storage API library 206 includes a number of software routines designed to facilitate data communication between data abstraction API library 204 and a permanent storage element 210, while cache storage API library 208 includes a number of software routines designed to facilitate data communication between data abstraction API library 204 and a cache storage element 212. As described above in connection with FIG. 1, permanent storage element 210 may include any number of different database configurations, e.g., an ORACLE database segment and a file-based database segment. In the preferred embodiment, cache storage element 212 is configured as a file-based database.

In the example environment depicted in FIG. 1, the program structure for extraction element 110 need not include or utilize cache storage API library 208. Similarly, the program structure for management/analysis element 126 need not include or utilize warehouse storage API library 206. Although not shown in FIG. 2, program structure 200 can interact with any number of distinct permanent storage and cache storage elements. In this respect, warehouse storage API library 206 and cache storage API library 208 may be capable of identifying or designating the particular location of stored data regardless of the actual physical arrangement of data storage devices. In addition, data extraction element 120 may be configured to retrieve requested data from any combination of permanent storage elements, cache storage elements, or other compatible storage elements.

Figure 3:
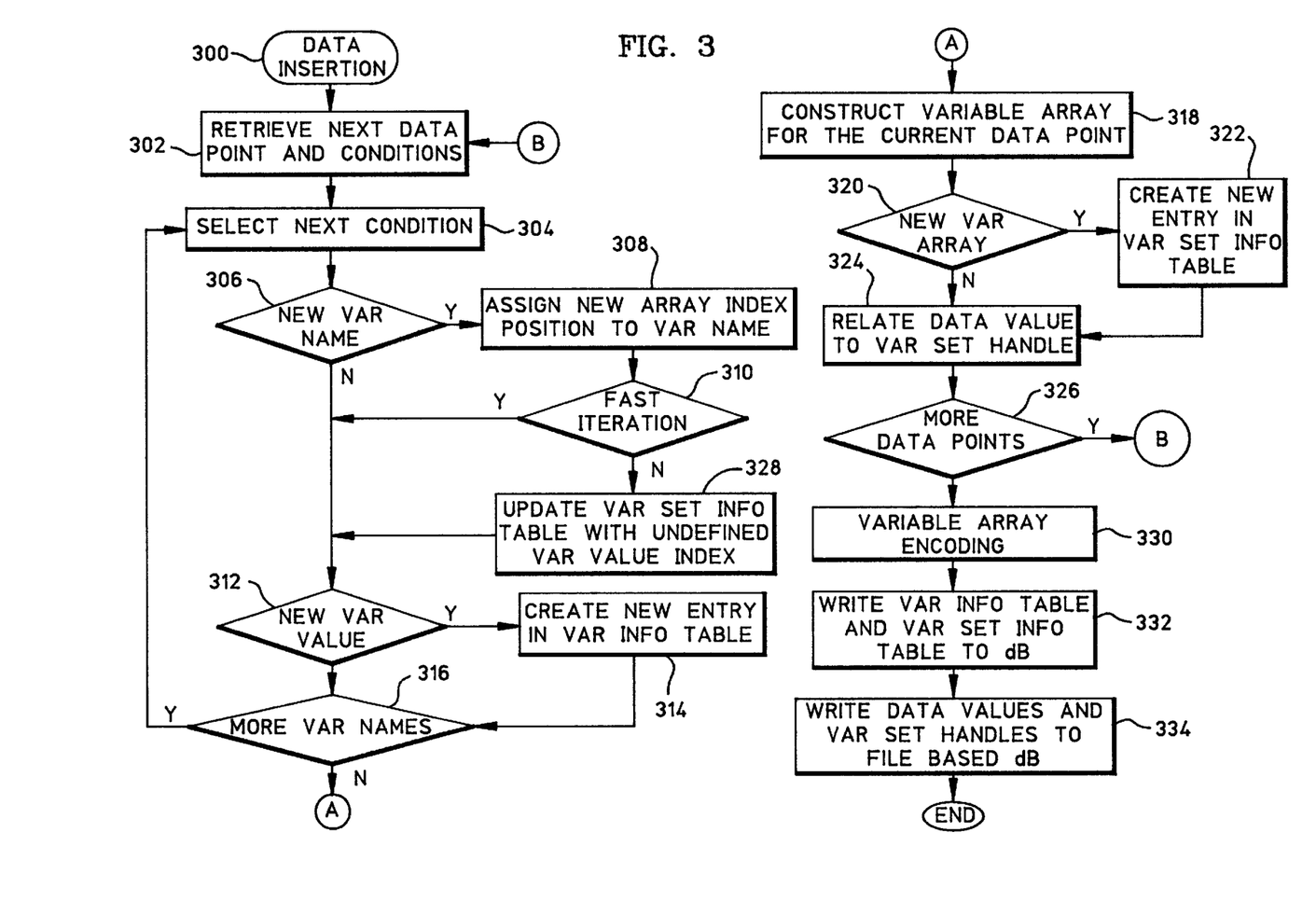
FIG. 3 is a flow diagram of a data insertion process.
Figure 4:
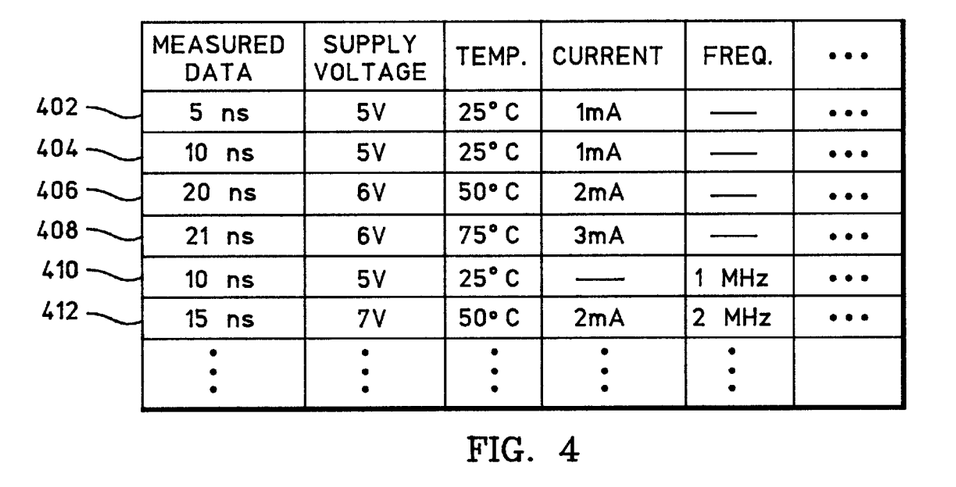
FIG. 4 is a table of illustrative data points and corresponding conditions.

As described above, raw data file insertion element 110 obtains a plurality of data points (each having a data value and a number of related conditions) and structures them for storage in a suitable database. FIG. 3 is a flow diagram of a data insertion process 300 according to the present invention. Process 300 assumes that a raw data file has been appropriately formatted in a manner that allows insertion element 110 to recognize the measured data values and conditions associated with each individual data point. FIG. 4 is a table of measured data points and corresponding conditions that will be utilized in the following illustrative example. In practice, a set of data points is typically identified by a lot number or a lot designation. The following description and example assumes that the lot has been previously identified for all of the data points. In a practical embodiment, a lot identifier can be embedded in the information obtained from data sources 102 or provided as an input to insertion parsers element 108 via a user interface or a command line argument. Although not described in detail herein, wafer-level (or any other hierarchical level) data points may be similarly identified by an appropriate wafer identifier.

Data insertion process 300 begins by retrieving a data point and its associated list (or group) of conditions from the raw data file (task 302). It should be appreciated that the present invention is also capable of processing data points having no associated conditions. In a practical embodiment, task 302 is performed by application logic layer 202 (see FIG. 2). In the exemplary semiconductor application described herein, the conditions may be related to any number of electrical test parameters, wafer identification information, testing dates and times, or the like. For purposes of this description, a condition is identified by a variable name identifier and a variable value identifier. For example, a first condition may be identified by the variable name "Supply" and the variable value "6 volts." A second condition may be identified by the variable name "Supply" and the variable value "8 volts." A third condition may be identified by the variable name "Temperature" and the variable value "30° C." Notably, the present invention can process any number of variable names and any number of variable values, and the variable names and variable values may be represented by any numeric, alphanumeric, or symbolic character string.

For the example data shown in FIG. 4, a first data point 402 (having a measured data value of 5 nanoseconds) has the following list of conditions: supply=5 volts; temperature= 25° C.; and current=1 mA. Insertion element 110 selects a condition, i.e., a combination of a variable name identifier and a corresponding variable value identifier, from the current list of conditions (task 304). In the practical embodiment described herein, tasks 304, 306, 308, 310, 312, 314, 316, 318, 320, 322, and 328 are performed by data abstraction API library 204. For the example data, task 304 may select any of the three applicable conditions, e.g., the supply voltage condition of 5 volts.

Data insertion process 300 analyzes the variable name identifier associated with the currently selected condition to determine whether the variable name identifier has already been accounted for, i.e., whether the variable name identifier is "new" (query task 306). If the current variable name identifier is new, then the process flow leads to task 308. Otherwise, the process flow leads to query task 312. In this example, task 308 is performed because "supply" is a new variable name identifier. Task 308 assigns a new variable array index position to the new variable name identifier. In a practical embodiment, task 308 stores the index position in electronic memory to serve as a temporary "placeholder." Conceptually, task 308 reserves a column or array location for the variable name. Accordingly, for this example, task 308 assigns a first variable array index location corresponding to "supply".

If data insertion process 300 is in the first iteration (query task 310), then the process flow proceeds to a query task 312. If not, then the presence of a new variable name may have additional implications (described in detail below with task 328).

Query task 312 analyzes the variable value identifier associated with the currently selected condition to determine whether the variable value has already been accounted for, i.e., whether the variable value identifier is "new." If the current variable value identifier is new, then data insertion process 300 creates a new entry in a VarInfo table (task 314). If the current variable value identifier has already been accounted for, then a query task 316 is performed. For the current iteration of this example, an appropriate VarInfo table entry is created because the variable value identifier of "5 volts" is new.

Figure 5:
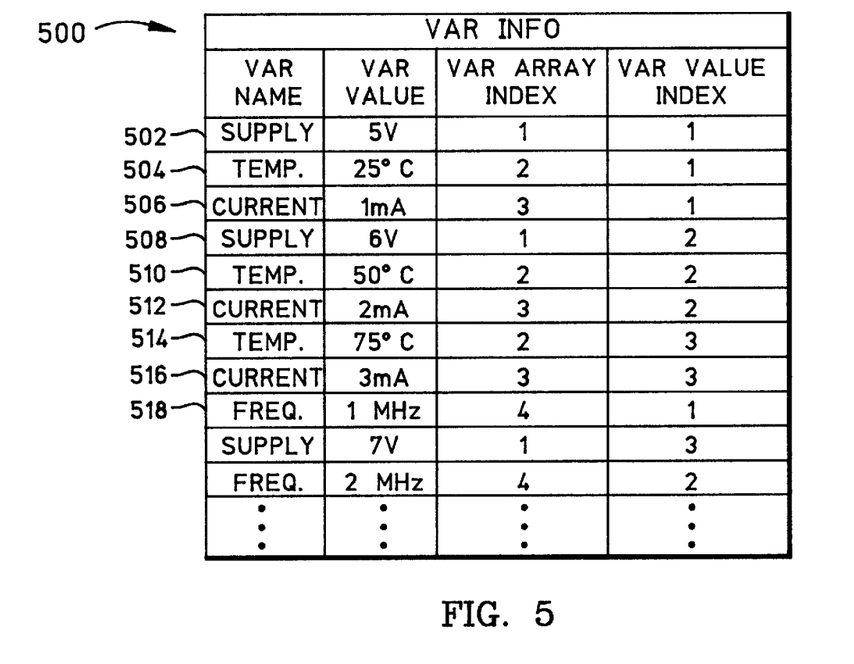
FIG. 5 is a table of illustrative variable values and variable array indices.

One suitably formatted VarInfo table 500 corresponding to the example set forth herein is depicted in FIG. 5. VarInfo table 500 is created in an iterative manner as data insertion process 300 progresses through the received data points. Following the first iteration of task 314, VarInfo table 500 only includes the first entry 502. As shown in FIG. 5, each entry (representing a unique condition associated with the given set of data points) in VarInfo table 500 preferably includes a variable name identifier, a variable value identifier, a variable array index identifier, and a variable value index identifier. In a practical system, the variable array index identifier and the variable value index identifier are represented by numbers. In connection with task 314, process 300 assigns the variable array index identifier and the variable value index identifier to the current condition. For first entry 502, the variable name identifier is "supply", the variable value identifier is "5 volts", the variable array index identifier is "1", and the variable value index identifier is "1". In the context of this example, the variable array index identifier of "1" means that "supply" is associated with the first variable array position, while the variable value index identifier of "1" means that the 5 volt value is the first supply value encountered.

Once VarInfo table 500 has been updated with the new entry, query task 316 is executed to determine whether more variable names are associated with the current data point. As described above, a given data point may have any number of corresponding conditions. Consequently, if more variable names are present, then data insertion process 300 is re-entered at task 304, which selects the next condition for analysis. In this manner, tasks 304, 306, 308, 312, 314, and 316 are repeated until all of the conditions for the first data point 402 have been reviewed. The second and third iterations of task 314 respectively create a second entry 504 and a third entry 506 in VarInfo table 500. As shown, the second entry 504 indicates that the variable name identifier "temperature" is associated with the second variable array position, i.e., the corresponding variable array index identifier is "2". In addition, the variable value identifier "25° C." is associated with the first temperature value encountered, i.e., the variable value index identifier for the second entry 504 is "1". In accordance with this scheme, the third entry 506 designates the 1 mA electrical current condition with the variable array index identifier of "3" and the variable value index identifier of "1".

It should be noted that, rather than utilize the variable array index and variable value index technique, the present invention may assign any suitable variable identifier to each unique condition in the set of data points. For example, the variable array index identifier may be combined, processed, or encoded with the variable value index identifier to obtain such a variable identifier. The variable identifier may be an array, a character string, or a plurality of numbers. Thus, the particular manner in which the different conditions are identified can vary from one system to another.

After all of the conditions related to the first data point 402 have been documented, query task 316 causes data insertion process 300 to construct a variable array (task 318) that is associated with the particular combination of conditions. In the preferred embodiment, a number of distinct variable arrays are ultimately constructed such that each of the variable arrays represents a unique combination of conditions associated with the set of data points. Task 318 may construct a temporary rendition of the current variable array by assigning the variable value index identifiers to the respective variable array index locations. For example, the variable array corresponding to the first data point 402 would be [1, 1, 1]. In an alternate embodiment, the variable array may be partially constructed as each individual condition for the given data point is analyzed.

Data insertion process 300 then determines whether the variable array constructed in task 318 has already been considered (query task 320). In other words, query task 320 tests whether the variable array is "new". If so, then a task 322 is performed to create a new entry in a VarSetInfo table. If not, then the process flow proceeds to a task 324. A negative response to query task 320 indicates that the measured data point was obtained under the same set of conditions as a previously inserted data point. In this example, task 322 is performed because the variable array [1, 1, 1] has not been previously encountered.

Figure 6:
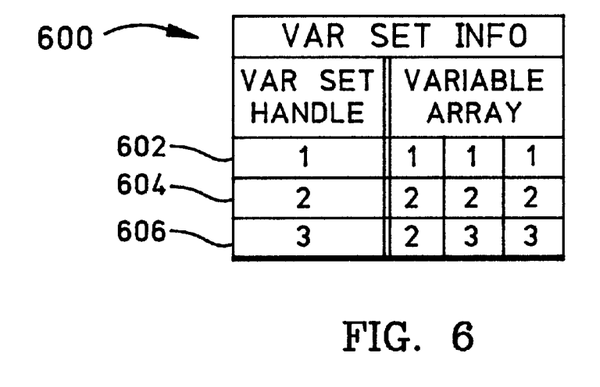
FIG. 6 is a table of illustrative variable arrays and corresponding variable set handles.

FIG. 6 depicts a VarSetInfo table 600 suitable for use in connection with the present invention and indicative of the example data described herein. Table 600 may be created in an iterative manner as data insertion process 300 is carried out. For example, in response to the first iteration of task 322, a first entry 602 is created in table 600. First entry 602 preferably includes the current variable array of [1, 1, 1] and the corresponding variable set handle of "1", which identifies that variable array. In a preferred practical embodiment, the variable set handle is represented by a number. In addition, the preferred embodiment is configured such that a unique variable set handle is assigned to each different variable array.

Task 324 is performed to assign or relate the current data value to an appropriate variable set handle. The current data value may be the measured test data generated under the current combination of test conditions. In a practical embodiment, the specific data value for the current data point is associated with one variable set handle for storage in one or more database elements. For the example data point 402, the measured data value of 5 nanoseconds is suitably linked to the variable set handle of "1". This relationship is depicted as the first entry in the table shown in FIG. 7. In contrast to this methodology, where any combination of conditions can be uniquely identified by a single handle, a less efficient data structuring process would store the measured data along with each of the related conditions.

If the data set contains more data points (query task 326), then data insertion process 300 is re-entered at task 302 such that additional VarInfo table entries and/or additional VarSetInfo table entries can be made. In a practical embodiment, query task 326 is performed by application logic layer 202 (see FIG. 2). Briefly, the second data point 404 (see FIG. 4) in the example has a measured data value of 10 nanoseconds and the following set of conditions: supply=5 volts; temperature=25° C.; and current=1 mA. For this data point, query tasks 306 and 312 will determine that each of the conditions have been previously encountered (the same set of conditions are associated with first data point 402). Consequently, no new entries need be made in VarInfo table 500 and no new entries need be made in VarSetInfo table 600. Thus, task 324 will form a relationship between the data value for the second data point, i.e., 10 nanoseconds, and the variable set handle of "1" (see FIG. 7). Notably, this methodology leverages the redundancy in the data point conditions to create an efficient data structure.

With respect to the third data point 406 (measured value= 20 nanoseconds; supply=6 volts; temperature=50° C.; current=2 mA), all three of the variable names have been previously encountered. However, all three of the specific variable values are new. Thus, task 314 creates new entries in VarInfo table 500 to reflect each of the new variable values. In this respect, entry 508 corresponds to the 6 volt supply value, entry 510 corresponds to the 50° C. temperature value, and entry 512 corresponds to the 2 mA electrical current value. Notably, although the respective variable array index identifiers remain consistent with the first and second data points, each of the variable value index identifiers is "2", which indicates that these are the second values for each of the variable names.

VarSetInfo table 600 will be updated to include an entry for the new variable array associated with the third data point 406. As shown in FIG. 6, the variable array [2, 2, 2] is suitably identified by the variable set handle of "2". In addition, task 324 relates the variable set handle of "2" to the measured data value of 20 nanoseconds.

Figure 7:
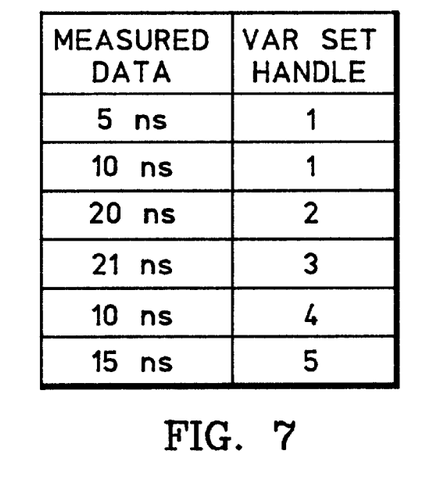
FIG. 7 is a table of illustrative data point values and corresponding variable set handles.

Regarding the fourth example data point (measured value=21 nanoseconds; supply=6 volts; temperature=75° C.; current=3 mA), only two of the three conditions reflect new values. Accordingly, Varinfo table 500 is updated to include entry 514 and entry 516, VarSetInfo table 600 is updated to include entry 606, and the measured data value of 21 nanoseconds is associated with the variable set handle of "3" (as shown in FIG. 7). Notably, the present invention can efficiently handle redundancy associated with individual conditions contained in a set of data points.

In accordance with a preferred aspect of the present invention, raw data file insertion element 110 is capable of dynamically handling any number of different conditions whether or not such conditions or the variable names are known a priori. Insertion element 110 is configured to recognize new or additional conditions in an efficient manner by expanding the size of VarInfo table 500 and/or VarSetInfo table 600. As an example of this capability, the analysis of the fifth data point 410 will be described in detail. The fifth data point 410 is characterized by the following: measured value=10 nanoseconds; supply=5 volts;

temperature=25° C.; and frequency=1 MHz. Notably, the fifth data point 410 does not contain a condition related to electrical current. In this respect, current may be considered to be a "don't care" condition.

The supply and temperature conditions for the fifth data point 410 are not new and, therefore, VarInfo table 500 need not be modified to accommodate these two conditions. However, "frequency" is a new variable name identifier and task 308 will operate to assign a new array index position to the variable name identifier of "frequency". As described above, the first three array positions have been reserved for "supply", "temperature", and "current", respectively. Thus, task 308 will assign the fourth array position to "frequency". As described above, query task 310 will determine that data insertion process 300 is not in its first iteration. Consequently, a task 328 may be performed to update VarSetInfo table 600 with one or more undefined variable value index identifiers. Task 328 is preferably performed such that all of the previous variable arrays are updated to reflect the new variable array index position. The specific variable values may be designated as "undefined" or "don't care" conditions.

Figure 8:
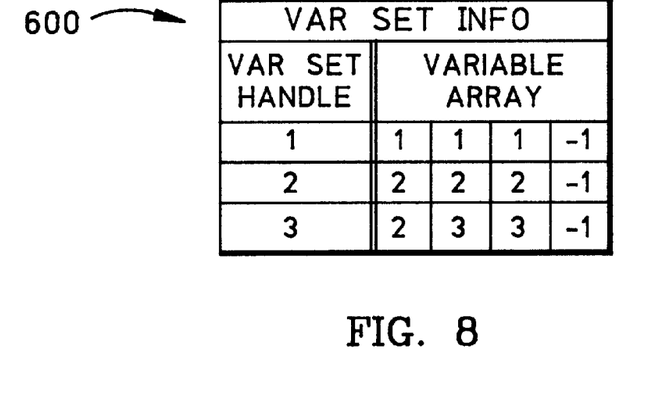
FIGS. 8 and 9 depict modified versions of the table shown in FIG. 6.

FIG. 8 depicts VarSetInfo table 600 following the updating of task 328. As shown, each of the previous three variable arrays now has four array index positions. However, the fourth array position has been reserved for the variable name "frequency", which is undefined for each of the previous three variable arrays. Consequently, data insertion process 300 preferably inserts a distinguishable variable value index identifier, e.g., "−1" to represent the undefined condition for these variable arrays. Any suitable index identifier may be employed in this context, and "−1" is used herein as a convenient example.

Figure 9:
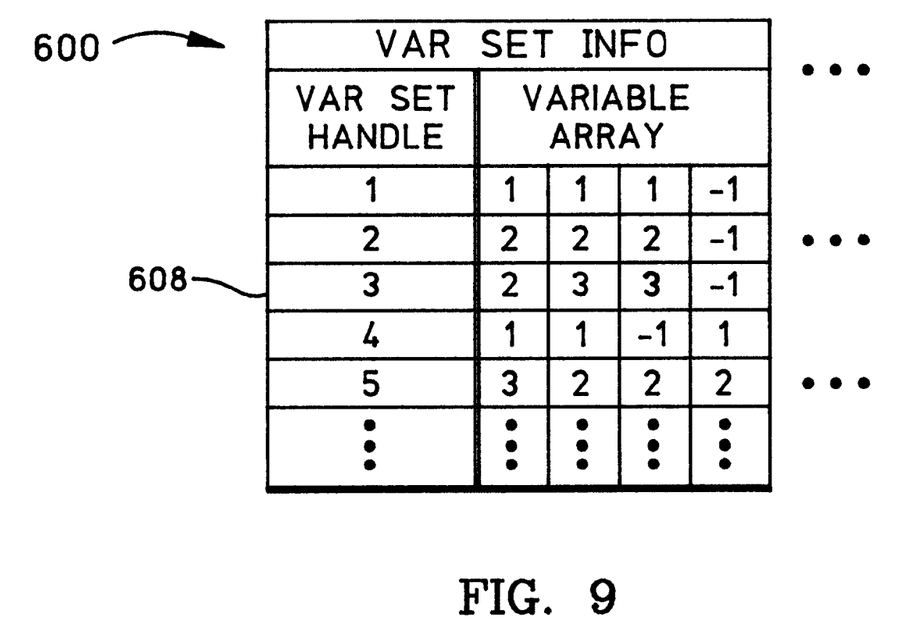

Query task 312 will recognize 1 MHz as a new variable value and prompt task 314 to create an entry 518 in VarInfo table 500. The variable array associated with the fifth data point 410 is constructed as [1, 1, −1, 1] and recognized as a new variable array (task 318 and query task 320). Thus, task 322 creates a new entry 608 in VarSetInfo table 600 (see FIG. 9). As shown, the "−1" variable value index identifier in entry 608 represents the undefined condition of "current" for the fifth data point 410. Any number of such undefined conditions may be included in a given entry in VarSetInfo table 600. Eventually, task 324 forms a relationship between the measured data value of 10 nanoseconds and the variable set handle of "4" (see FIG. 7).

The sixth data point 412 includes a measured data value obtained with all four conditions under consideration. Data insertion process 300 is repeated for this data point, VarInfo table 500 is updated to reflect the two new condition values, and VarSetInfo table 600 is updated to reflect the new variable array. The ellipses in FIG. 4, FIG. 5, and FIG. 9 indicate that the present invention is capable of receiving and configuring any number of data points having any number of conditions and any number of sets of conditions. It should be appreciated that the order in which the various conditions are analyzed is unimportant to the operation of data insertion process 300. For example, if, during the analysis of the third data point 406, the temperature condition is received ahead of the supply condition, the analysis will remain the same.

Referring again to query task 326, if all of the data points for the current data set have been analyzed, then the variable arrays may be suitably encoded for compatibility with a particular database format (task 330). In a practical embodiment, tasks 330, 332, and 334 are performed by warehouse storage API library 206 (see FIG. 2). In one practical embodiment, task 330 converts each of the variable arrays into a character string that can be recognized by a common DBMS. For example, although conventional ORACLE databases may not be capable of effectively storing arrays, they can store character strings in a straightforward manner. In one particular implementation of the present invention, the variable arrays are encoded using the VARCHAR2 data type. In this respect, four characters (bytes) are used to store each variable array index element. Each character can be in the range of 0×30 (ASCII for "0") to 0×6f (ASCII for "o"), which can store a 7-bit (0–63) value. With four characters per index, more than 16,500,000 unique condition values per condition can be stored.

It should be appreciated that any suitable encoding scheme may be used for compatibility with different database types. Furthermore, task 330 need not be performed in an object-oriented database environment or in any database environment capable of directly storing and managing array elements.

Data insertion process 300 eventually writes VarInfo table 500 and VarSetInfo table 600 to a suitable database element (task 332). As described above, the preferred embodiment writes these tables to primary database component 116 (see FIG. 1). Accordingly, database component 116 (and/or any number of related database components) is preferably configured with a data storage space or area defining VarInfo table 500 and a data storage space or area defining VarSetInfo table 600.

In addition, the measured data values and their corresponding variable set handles are written to a suitable database element (task 334). The preferred practical embodiment writes this information (see FIG. 7) to file-based database component 118. In this respect, database component 118 (and/or any number of related database components) is configured with a data storage area defining a data point table that relates one of a plurality of variable set handles to each of the individual data values.

Figure 10:
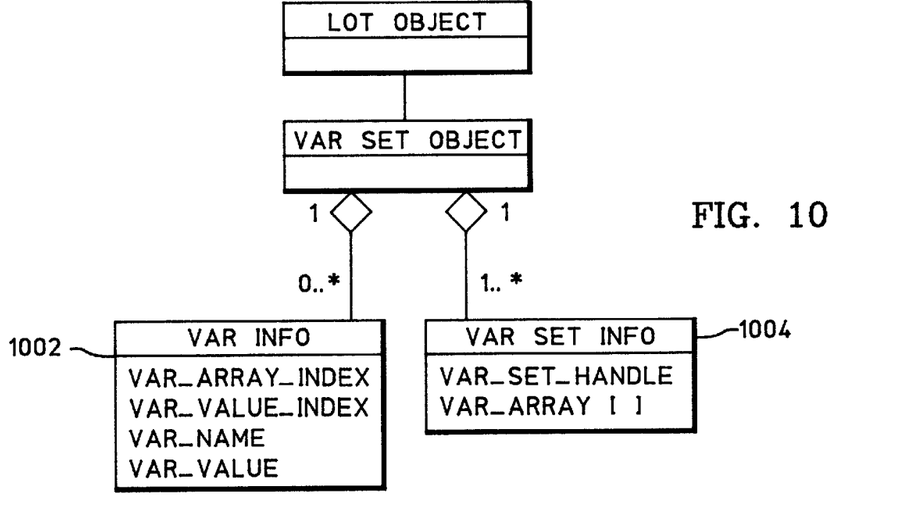
FIG. 10 is a Unified Modeling Language diagram depicting an object-oriented model of a database structure configured in accordance with the present invention.

At the completion of data insertion process 300, the database elements, e.g., those associated with permanent storage element 114, contain the data point information formatted and stored in an efficient manner. FIG. 10 is a Unified Modeling Language class diagram depicting an object-oriented model of a database structure configured in accordance with the present invention. As shown, an object-oriented implementation may establish a variable set object for the given set of data points. The information contained in VarInfo table 500 is realized in an element 1002, while the information contained in VarSetInfo table 600 is realized in an element 1004.

Figure 11:
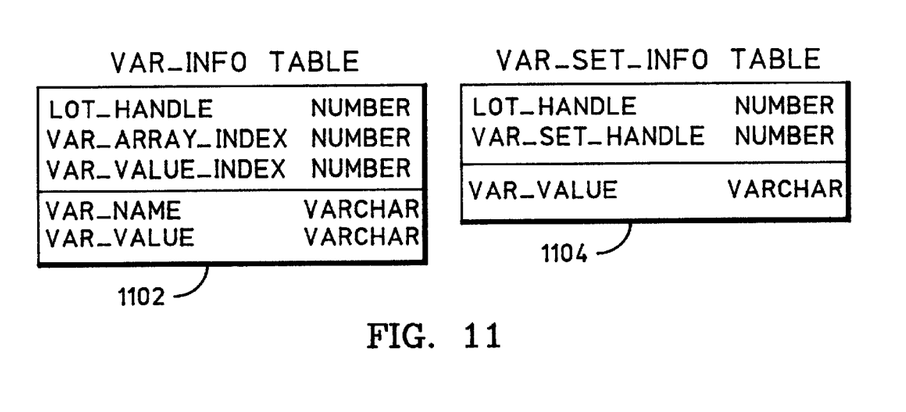
FIG. 11 is a diagram depicting an ORACLE database model of a database structure configured in accordance with the present invention.

In contrast, FIG. 11 is a diagram depicting an ORACLE database model of a database structure configured in accordance with the present invention. The information contained in VarInfo table 500 is realized in an element 1102, while the information contained in VarSetInfo table 600 is realized in an element 1104. As shown in FIG. 11, the set of data points may be suitably identified by a lot handle identifier (represented by a number). For purposes of the ORACLE format, the variable array index identifier, the variable value index identifier, and the variable set handle identifier are also represented by numbers. In contrast, the variable name identifier, the variable value identifier, and the variable array are all represented by character strings. As described above, the variable arrays may require encoding or conversion from an array format to a character string format compatible with the ORACLE database.

Figure 12:
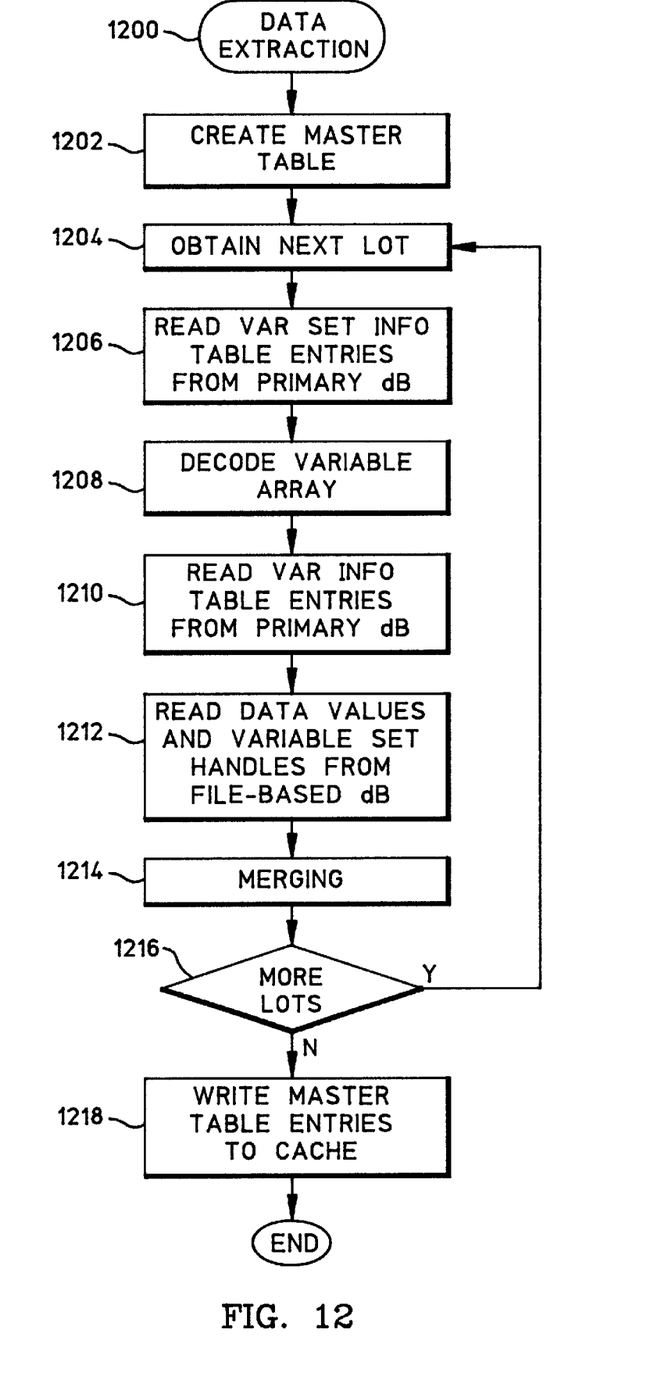
FIG. 12 is a flow diagram of a data extraction process.

FIG. 12 is a flow diagram of a data extraction process 1200 that may be performed by data extraction element 120 in response to a user request to retrieve and/or analyze data stored in accordance with the techniques described herein. Process 1200 assumes that the requested data has been structured, formatted, and stored in accordance with data insertion process 300.

Data extraction process 1200 may begin by creating a "master table" configured to accommodate the extracted data point information (task 1202). Ultimately, the master table will relate each of the extracted data values with a number of conditions. In the practical embodiment, task 1202 can be performed by data abstraction API library 204. As described in more detail below, the master table may be expanded to accommodate additional data points associated with different lots. In a practical object-oriented embodiment, the master table may be realized as a master variable set object and individual variable set objects may be created for each lot.

Data extraction process 1200 continues by obtaining the next lot of data points for extraction (task 1204). As described above, sets of data points are typically identified in accordance with a lot identifier; task 1204 may interrogate permanent storage element 114 to locate objects or other items corresponding to the particular lot identifier. In the practical embodiment described herein, task 1204 is performed by application logic layer 202. Once the lot is properly identified, a number of VarSetInfo entries are read from the respective database component (task 1206). In the preferred embodiment, these entries are read from primary database component 116. As described above, each VarSetInfo entry preferably includes a variable set handle and a corresponding variable array.

Tasks 1206, 1208, 1210, and 1212 may be suitably executed by warehouse storage API library 206. Thus, in connection with task 1206 (and other data reading tasks), warehouse storage API library 206 may utilize temporary electronic memory to represent the information read from the database component.

A task 1208 may be performed if necessary to decode any variable arrays that are maintained in character string format (or any other encoded format). In one embodiment, task 1208 converts variable arrays encoded for compatibility with a first database format employed by primary data storage component 116 into a format compatible with a second database structure. In a practical system, the first database format can be ORACLE based and the second database format can be file-based.

Data extraction process 1200 also reads a number of VarInfo entries from the respective database component, e.g., from primary database component 116 (task 1210). As described above, each VarInfo entry may include the following information related to each condition in the current data set: a variable name identifier, a variable value identifier, a variable array index identifier, and a variable value index identifier. Process 1200 also causes data extraction element 120 to read a number of individual data values and a number of corresponding variable set handles from the appropriate database component (task 1212). As described above, the data point values and variable set handles are preferably stored in file-based database component 118 and may be stored in any suitable format.

Data extraction process 1200 is capable of merging data from different lots to enable data correlation and other data management procedures. Accordingly, process 1200 may include a task 1214, which merges the information associated with a first lot of data points with information associated with a second lot of data points. Task 1214 is described in more detail below in connection with the merging of two lots.

As mentioned above, a user of the system can request data analysis or management of data points from multiple lots. Data extraction element 120 is preferably configured to efficiently extract and combine data from multiple lots and to create combined groupings that accommodate the users' needs. For example, if a user requests output frequency data for all devices tested with a supply voltage of 6 volts and an operating temperature of 30° C., then data extraction element 120 is capable of collecting and combining such data from different lots in an efficient manner.

Data extraction process 1200 may perform a query task 1216 to determine whether data points from other lots need to be extracted. If so, then process 1200 is re-entered at task 1204 such that the relevant data point information can be read from the appropriate database components. Eventually, task 1214 performed to suitably merge the extracted data from the second lot with the extracted data from the first lot.

In connection with task 1214, data extraction element 120 may suitably format data values, variable set handles, VarSetInfo table entries, and/or Varinfo table entries associated with one or more of the subject data point lots for merging into the master table. The merging function may also reassign array indices, reassign array value indices, expand tables, encode data, or carry out any suitable processing to accommodate multiple lots having different conditions, different combinations of conditions, or different variable indexing schemes. In this respect, task 1214 merges or formats data extracted from multiple lots using a common and consistent scheme that fosters efficient data analysis and management.

As an example, a data point from Lot A may have the following database storage structure: variable set handle=8, [5 volt supply, 25° C. temperature, 1 MHz frequency]=[1, 1, 1]; and a data point from Lot B may have the following database storage structure: variable set handle=8, [30° C. temperature, 5 volt supply]=[2, 2]. After merging, the data point from Lot B may have the following structure: variable set handle=25, [5 volt supply, 30° C. temperature, undefined frequency]=[1, 2, −1]. In this example, the Lot B data point has been reformatted for consistency with the structure of the Lot A data point. The original variable value index for the 5 volt supply has been changed from "2" to "1" for consistency with the index used for the Lot A data point. The variable set handle has been changed (which may be necessary to avoid duplicates), and an undefined/unknown variable value index has been utilized to represent the missing frequency condition.

The data extraction and merging procedures can be repeated for any number of different data point lots. In response to the merging procedure, the master table may include a master VarSetInfo table, a master VarInfo table, and a master table associated with the individual data point values and their corresponding variable set handles. If no additional lots need be extracted, then query task 1216 exits to a task 1218. Task 1218 writes the master VarSetInfo entries and the master VarInfo entries to another database component. In the preferred embodiment, these entries are written to cache storage element 122. In addition, task 1218 preferably writes the master list of data point values and variable set handles to the cache storage element 122. In this manner, data extraction process 1200 facilitates the extraction and transfer of any selected subset of data points stored in permanent storage element 114.

As described above, the data stored in cache storage element 122 may be accessed, manipulated, managed, and/or analyzed by data management and analysis element 126. For example, the cache storage API library 208 of data management and analysis element 126 may read a number of entries from cache storage element 122, e.g., VarSetInfo table entries, Varinfo table entries, data point values, and variable set handles. Then, the data abstraction API library 204 can create a table or a variable set object associated with the data points to be analyzed. In the preferred embodiment, the table is formatted such that the data can be efficiently searched, analyzed, reported or otherwise handled by the system. Once the requested data points have been retrieved from the cache storage element 122, the application logic layer 202 of data management and analysis element 126 suitably processes the data in accordance with the user instructions. As described above, the system can accommodate any number of collection, management, analysis, reporting, and other routines as long as such routines are capable of recognizing the ultimate arrangement of the data values and conditions.

Figure 13:
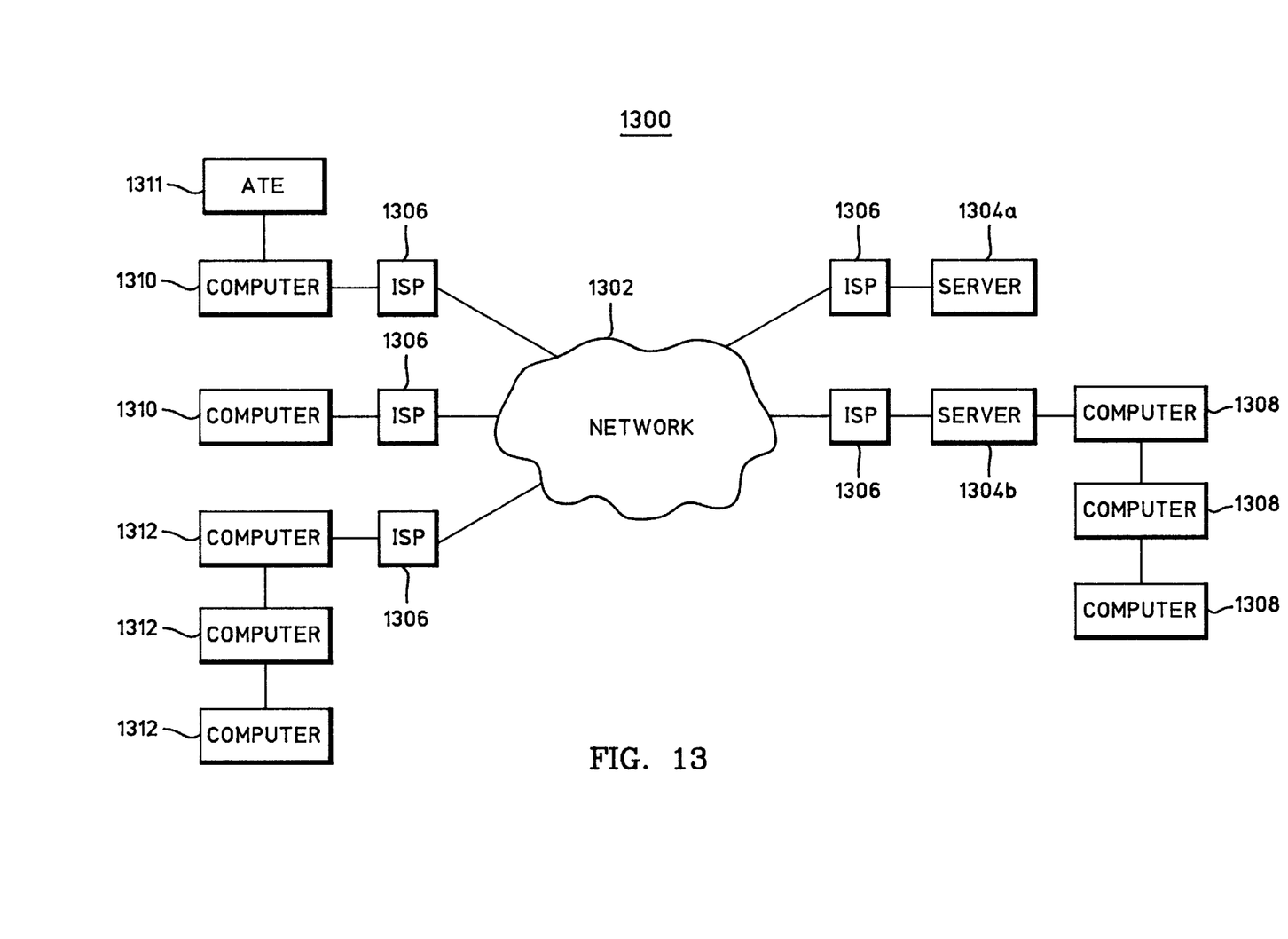
FIG. 13 is a schematic representation of a network environment in which the techniques of the present invention may be implemented.

In accordance with one practical embodiment of the present invention, the system components are implemented in a network environment, e.g., the Internet. FIG. 13 is a schematic representation of an exemplary environment 1300 in which the techniques of the present invention may be realized. Network 1302 may be any communication network, e.g., the Internet, that facilitates the transmission of data. Internet environment 1300 includes a number of server computers 1304 that communicate with network 1302 via internet service providers 1306. A server computer 1304b may be associated with a network of additional computers 1308, e.g., server computer 1304b may be part of a local area network or an intranet. Any of the server computers 1304 may host one or more of the software components described above. For example, a server computer 1304 may host application programs related to the formatting and reporting of data managed or analyzed by the system.

A number of client stations or computers 1310, 1312 (client computers 1312 are illustrated in the form of a local area network or an intranet) are also configured to communicate with network 1302 via internet service providers 1306. A client computer 1310 may communicate with automated test equipment 1311 (or any suitable data source) to obtain test data for database insertion as described above. In accordance with known techniques, client computers 1310, 1312 can access data, content, documents, and files maintained on server computers 1304. Internet environment 1300 is capable of supporting the World Wide Web (WWW), which comprises a plurality of interconnected servers 1304 that utilize, for example, the Hypertext Transfer Protocol (HTTP) for purposes of transmitting data between client and server nodes. In this manner, text files, graphic files, sound files, video files, and the like, can be exchanged using HTML.

In the context of a practical application of the present invention, the client stations may be associated with semiconductor manufacturers and semiconductor characterization data may be processed and formatted into HTML documents that are accessible to authorized users via the Internet or an intranet. In addition, the client stations may access a suitable web site maintained by the semiconductor manufacturer or a third party host, where the web site makes the formatted data and reports available to the client stations.

Computers 1308, 1310, 1312 may include a web browser program that provides a graphical user interface (GUI) for easy access to content maintained at servers 1304 via Internet service providers 1306. In this respect, server computers 1304 may maintain software features that function as a web site to provide files, documents, and pages to remote users of the Internet. By entering a specific URL in a web browser, a client user will gain access to a web site maintained by one of the servers 1304. Of course, the display screen for viewing the web pages may be implemented as a television screen, a WAP phone, a personal digital assistant, a laptop computer, or any suitable computing device.

The present invention has been described above with reference to a preferred embodiment. However, those skilled in the art having read this disclosure will recognize that changes and modifications may be made to the preferred embodiment without departing from the scope of the present invention. For example, the process tasks shown and described may be performed in a different order and any number of alternative and/or additional process tasks may be implemented in a practical embodiment. These and other changes or modifications are intended to be included within the scope of the present invention, as expressed in the following claims.

What is claimed is:

1. A method for structuring a set of data points, comprising:

obtaining a plurality of data points, each having a data value and zero or more conditions associated therewith;

assigning a variable identifier to each unique condition associated with said plurality of data points, thereby assigning a plurality of variable identifiers;

constructing a number of variable arrays, each of said variable arrays representing a number of said variable identifiers;

designating a variable set handle for each unique combination of one or more of said variable identifiers, thereby assigning a plurality of variable set handles;

creating a VarSetInfo table that assigns said variable set handles to said variable arrays; and, using said VarSetInfo table to relate individual data values to one of said variable set handles.

2. A method according to claim 1, wherein each condition comprises a variable name and a variable value.

3. A method according to claim 1, wherein each of said variable identifiers comprises a variable array index identifier and a variable value index identifier.

4. A method according to claim 1, further comprising the step of encoding said variable arrays for compatibility with a database format.

5. A method according to claim 1, further comprising the step of writing said VarSetInfo table to a database.

6. A method according to claim 1, wherein said assigning step creates a VarInfo table that includes, for each unique condition associated with said plurality of data points, a variable name identifier, a variable value identifier, and one of said variable identifiers.

7. A method according to claim 6, further comprising the step of writing said VarInfo table to a database.

8. A method according to claim 1, further comprising the step of writing said individual data values with their related variable set handles to a database.

9. A method according to claim 8, wherein said writing step writes said individual data values with their related variable set handles to a file-based database.

10. A method according to claim 1, wherein said plurality of data points comprises characterization data.

11. A method for extracting data points from a database, each data point having a data value and at least one condition associated therewith, comprising:

(a) reading, from a first data storage location, a number of individual data values and a number of corresponding variable set handles;

(b) reading a number of entries from a VarSetInfo table maintained at said first data storage location, said VarSetInfo table including said variable set handles and a number of variable arrays respectively assigned to said variable set handles;

(c) reading a number of entries from a VarInfo table maintained at said first data storage location, said VarInfo table including, for each unique condition associated with a set of data points, a variable name identifier, a variable value identifier, a variable array index identifier, and a variable value index identifier; and (d) creating a master table that relates each of said individual data values with a number of conditions.

12. A method according to claim 11, further comprising the step of writing said master table to a database.

13. A method according to claim 12, wherein said writing step writes said master table to a file-based cache database.

14. A method according to claim 11, wherein:

said variable arrays are initially encoded for compatibility with a first database format employed by said first data storage location; and said method further comprises the step of decoding said variable arrays for compatibility with a second database format.

15. A method according to claim 14, wherein:

said first database format is compatible with character strings; and said second database format is compatible with integer arrays.

16. A method according to claim 11, wherein:

said steps (a), (b), (c), and (d) are initially performed for a first set of data points;

said steps (a), (b), and (c) are repeated for a second set of data points; and said method further comprises the step of formatting data values, variable set handles, VarSetInfo table entries, and VarInfo table entries for said second set of data points for merging with said master table.

17. A computer-readable data storage medium configured to accommodate a plurality of data points, said computer-readable data storage medium comprising:

a first data storage area defining a data point table that relates one of a plurality of variable set handles to each of a plurality of individual data values;

a second data storage area defining a VarSetInfo table that relates a unique variable array to each of said plurality of variable set handles; and a third data storage area defining a VarInfo table having an entry for each unique condition associated with said plurality of data points, each entry including a variable name identifier, a variable value identifier, a variable array index identifier, and a variable value Index identifier.

18. A data storage medium according to claim 17, wherein each of said variable arrays is associated with a unique combination of conditions associated with said plurality of data points.

19. A data storage medium according to claim 17, wherein each of said variable arrays is encoded for compatibility with a format associated with said second data storage area.

20. A data storage medium according to claim 17, wherein at least one of said first, second, and third data storage areas is associated with a file-based database format.

21. A data storage medium according to claim 20, wherein:

said first data storage area is associated with said file-based database format; and said second and third data storage areas are associated with a DBMS-based storage format.

22. A method for structuring a set of data points, comprising:

obtaining a plurality of data points, each having a data value and at least one condition associated therewith;

creating a VarInfo table that includes, for each unique condition associated with said plurality of data points, a variable name identifier, a variable value identifier, a variable array index identifier, and a variable value index identifier;

constructing a number of distinct variable arrays, each of said variable arrays being associated with a unique combination of conditions associated with said plurality of data points; and creating a VarSetInfo table that assigns a unique variable set handle to each of said variable arrays, thereby, assigning a plurality of variable set handles.

23. A method according to claim 22, further comprising the step of relating individual data values to one of said variable set handles.

24. A method according to claim 23, further comprising the step of writing said individual data values with their related variable set handles to a database.

25. A method according to claim 24, wherein said writing stop writes said individual data values with their related variable set handles to a file-based database.

26. A method according to claim 22, wherein said constructing step constructs said variable arrays such that said variable array index identifiers correspond to said variable name identifiers and such that said variable value index identifiers correspond to said variable value identifiers.

27. A method according to claim 22, wherein sail constructing step constructs said variable arrays such that the number of different variable array index identifiers equals the number of different variable name identifiers associated with said plurality of data points.

28. A method according to claim 22, wherein said constructing step constructs a variable array having a variable value index identifier that represents an undefined condition for at least one of said plurality of data points.

29. A method according to claim 22, further comprising the step of encoding said variable arrays for compatibility with a database format.

30. A method according to claim 22, further comprising the step of writing said VarSetInfo able to a database.

31. A method according to claim 22, further comprising the step of writing said VarInfo table to a database.

* * * * *